Figure 7:
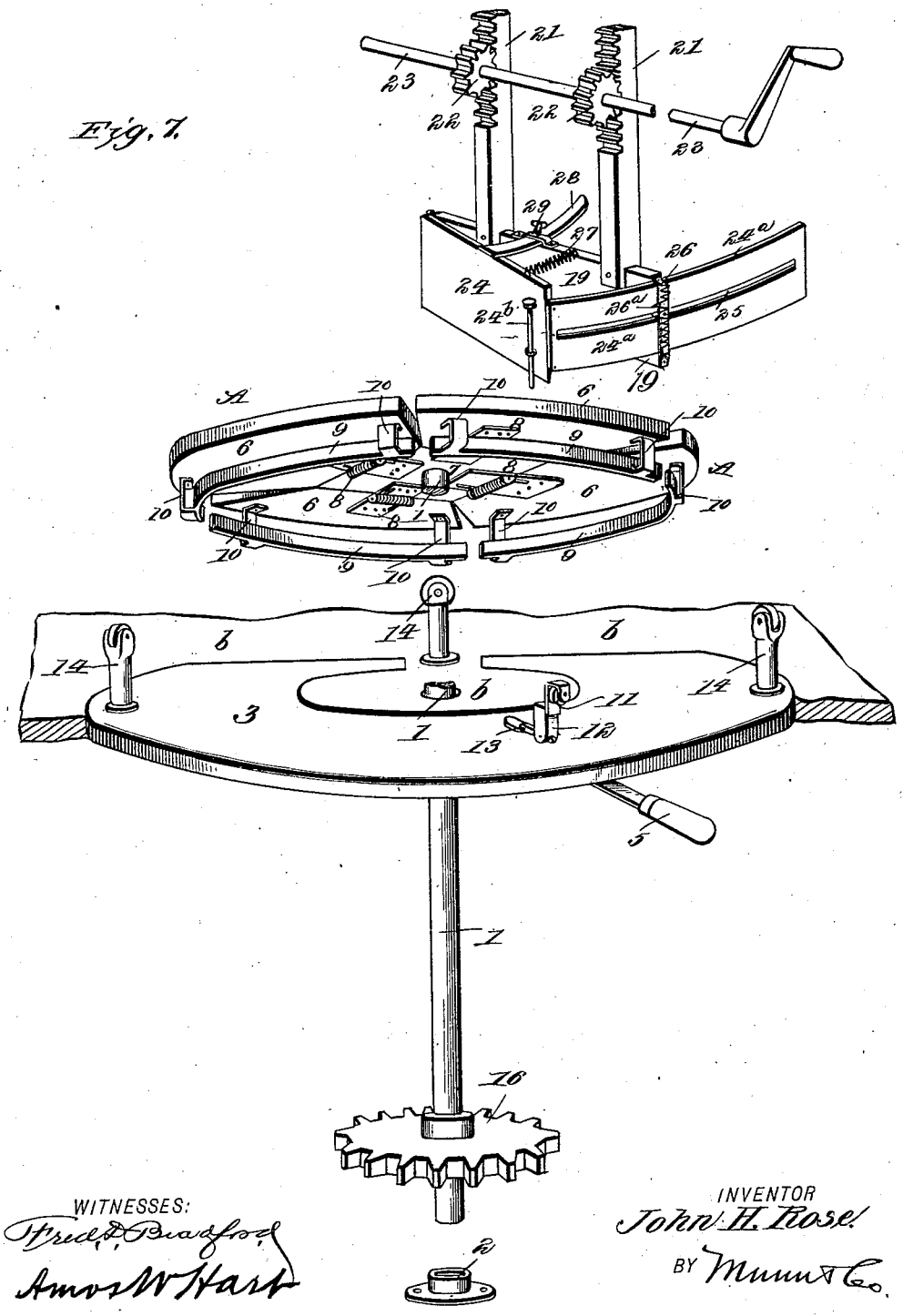

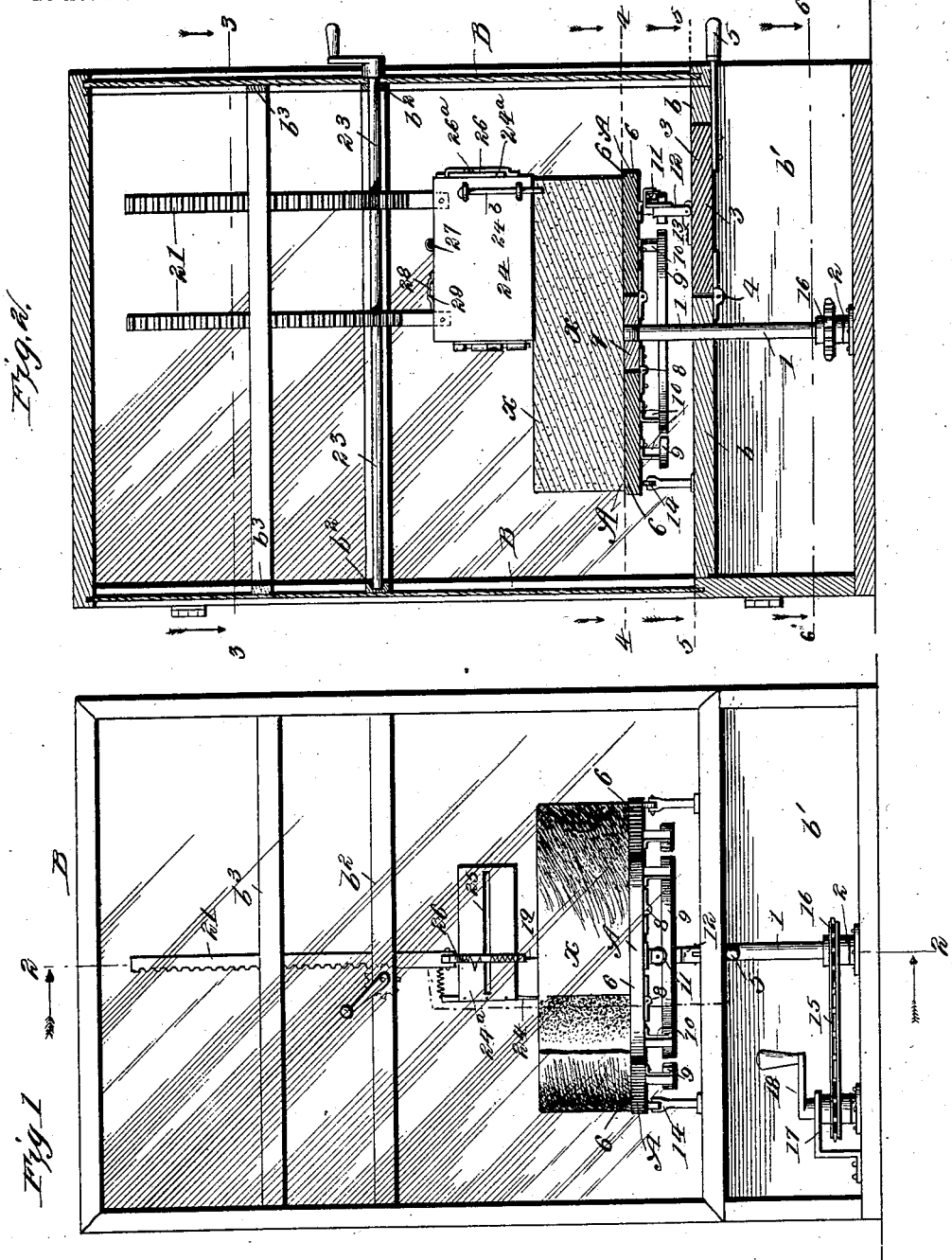

No. 724,334. PATENTED MAR. 31, 1903.
J. H. ROSE.
CHEESE CUTTER AND SLICE DISCHARGER.
APPLICATION FILED DEC. 19, 1902.
NO MODEL. 4 SHEETS—SHEET 2.
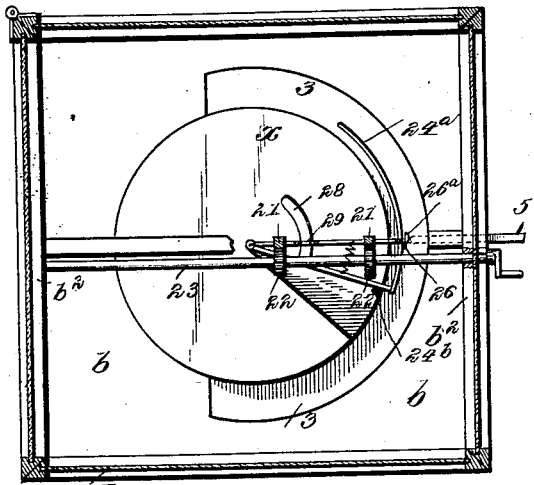
WITNESSES:
Fred P. Bradford
Amos W. Hart
INVENTOR
John H. Rose
BY Munn & Co.
ATTORNEYS.

No. 724,334. PATENTED MAR. 31, 1903.
J. H. ROSE.
CHEESE CUTTER AND SLICE DISCHARGER.
APPLICATION FILED DEC. 19, 1902.
NO MODEL. 4 SHEETS—SHEET 3.

WITNESSES:

INVENTOR
John H. Rose
BY Munn & Co.
ATTORNEYS.

No. 724,334. PATENTED MAR. 31, 1903.
J. H. ROSE.
CHEESE CUTTER AND SLICE DISCHARGER.
APPLICATION FILED DEC. 19, 1902.
NO MODEL. 4 SHEETS—SHEET 4.
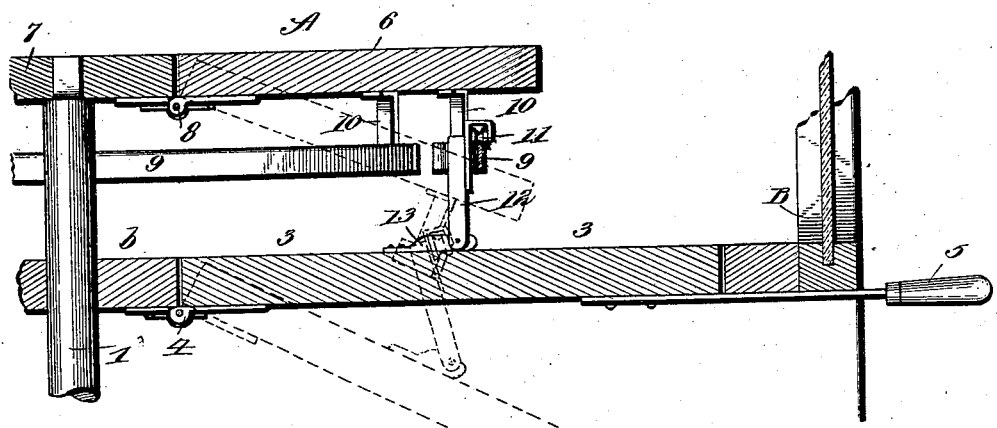
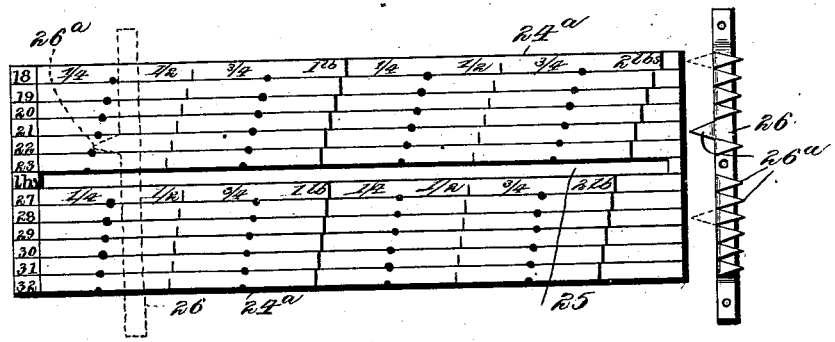
WITNESSES:
INVENTOR
John H. Rose.
BY Munn & Co.
ATTORNEYS.

UNITED STATES PATENT OFFICE.

JOHN HENRY ROSE, OF SHREVEPORT, LOUISIANA.

CHEESE-CUTTER AND SLICE-DISCHARGER.

SPECIFICATION forming part of Letters Patent No. 724,334, dated March 31, 1903.

Application filed December 19, 1902. Serial No. 135,886. (No model.)

*To all whom it may concern:*

Be it known that I, JOHN HENRY ROSE, a citizen of the United States, and a resident of Shreveport, in the parish of Caddo and State of Louisiana, have made certain new and useful Improvements in Cheese-Cutters and Slice-Dischargers, of which the following is a specification.

My invention is an improved apparatus adapted for cutting cheese and delivering the slices.

The construction, arrangement, and operation of parts are as hereinafter described, and shown in the accompanying drawings, in which—

Figure 1 is a side elevation of the apparatus with an inclosing case or box having a glass front. Fig. 2 is a vertical central section on the line 2 2 of Fig. 1. Fig. 3 is a horziontal section on the line 3 3 of Fig. 2. Fig. 4 is a horizontal section on the line 4 4 of Fig. 2. Fig. 5 is a horizontal section on the line 5 5 of Fig. 2. Fig. 6 is a horizontal section on the line 6 6 of Fig. 2. Fig. 7 is a perspective view of the principal working parts or mechanisms disassociated. Fig. 8 is a vertical section of a portion of the cheese-table proper and the slice-discharger below it. Fig. 9 is an enlarged face view of the slice-gage plate and the index forming an attachment of the same. Fig. 10 is a perspective view of the index or marker forming such attachment of the gage-plate.

Referring in the first instance to Figs. 1, 2, the cheese X to be cut is supported upon a table A, which is in turn supported upon and adapted to rotate with a vertical shaft 1, which is stepped at 2 on the bottom of the box or case B, in which all the working parts are inclosed. The upper portion of said shaft 1 passes through and is journaled and supported in the transverse partition *b* of the box B. The said partition *b* is cut out, as shown at Figs. 5 and 7, the portion 3 so cut out serving to receive a slice severed from the cheese X and delivered upon it in the manner to be presently described. As shown in Fig. 2, the slice receiver and discharger 3 is hinged at 4 (see Figs. 2 and 8) and provided with a forwardly-projecting thumb-lever 5, by which it may be depressed. The hinges 4 are provided with torsion-springs, (see Fig. 8,) which serve to support the table or discharger 3 normally horizontal.

Referring especially to Figs. 4 and 7, it will be seen that the table A, upon which the cheese is supported, is divided into five parts—that is to say, four sector-shaped parts 6 and a central part 7, which is secured to the shaft 1. The parts 6 are all connected with the central part 7 by spring-hinges 8, (see Fig. 7,) which tend to hold the said parts 6 normally in horizontal position. From the under side of each of the sectors 6 is suspended a curved flange or rail 9, (see Figs. 1 and 7,) the means of suspension and attachment being hangers or brackets 10. As shown in Fig. 7, it will be seen that these flanges or rails 9 constitute, in effect, an interrupted or sectional track. Upon such track runs a roller 11, (see Figs. 1, 2, 8,) which is journaled in an S-shaped arm 12, (see Figs. 7, 8,) the same forming a pivotal attachment of a piece 13, which is fixed by screws or nails to the slice receiver and discharger 3. It will now be understood that when the cheese-table A is rotated the wheel 11 runs on from one rail 9 to the other and that when a slice has been cut the operator depresses the slice receiver and discharger 3 by pressing downward on the thumb-lever 5, (see Figs. 2, 7, 8,) whereby the device 11 12 pulls down that sector 6 of the cheese-table A which is at the time immediately above it. Thus the slice cut from the cheese X slides first off the depressed sector 6 of the cheese-table upon the hinge-plate 3 below and from the latter is delivered into the base-compartment *b'*, Figs. 1, 2, 6, of the casing or box B, where it is readily accessible. This operation of the sector 6 and slice receiver and discharger 3 is illustrated by dotted lines, Fig. 8. In addition to the spring-hinges 8 for supporting the cheese-table sector 6 horizontally I provide the devices 14, (see Figs. 1, 2, 7,) the same consisting of small posts set in the slice-discharger 3 and provided with antifriction-rollers in their upper ends, which run in contact with the under side of the table A. While this arrangement of the parts 14 may be preferred, it is obvious that their arrangement might be reversed—that is to say, they might be attached to the under side of the table A and the rollers run in contact with the parts $b^3$ below.

For rotating the shaft 1, carrying the cheese-table A, I employ a chain 15, (see Figs. 1 and 6,) which runs on sprocket-wheels 16 and 17, the former, 16, being keyed on the shaft 1 and the latter, 17, being journaled on a short shaft provided with a crank 18 for rotating it.

I will now describe the cheese-cutting mechanism proper, together with the slice-gage attachment. Referring especially to Figs. 1, 2, 7, a knife or cutter 19 is attached to the lower ends of two rack-bars 20, which are arranged vertically and guided in suitable ways in bars $b^2$ and $b^3$, arranged transversely in the box or casing B. Pinions 22 engage these racks, the same being mounted upon a transverse crank-shaft 23, and it is obvious that by rotating the shaft the knife may be raised or forced down, as required. A slice-supporting plate 24 is hinged loosely to the inner end of the knife or cutter 19 and is made of the same length as the latter and of the same width, as shown in Fig. 1. To the outer end of this slice-supporting plate 24 is attached a gage-plate, the same being arc-shaped and provided with a sectional longitudinal slot 25. It runs in a keeper 26, which is attached to the outer end of the knife 19, and forms also an index, as will be presently described. The knife 19 and slice-plate 24 being hinged, as described, it is apparent that they may be open at a greater or less angle and that when so opened if the knife be brought down upon the cheese a slice of corresponding dimensions will be cut. The parts 19 24 are drawn normally toward each other by means of a spring 27, (see Fig. 7,) and for the purpose of further guiding the plate 24 an arc-shaped bar 28 is attached to its upper edge and slides in a keeper 29, attached to the knife 19. A clamp-screw may be applied to the said keeper for locking the bar 28 in any adjustment. A rod $24^b$ (see Figs. 2 and 7) is supported vertically and slidably in keepers on the plate 24 and normally projects below the edge of the latter.

Let it now be supposed that a sector-shaped piece has already been cut from the cheese X, as indicated in Figs. 1 and 3. If the shaft 1 be rotated to place the cheese X in due position and the crank-shaft 23 be rotated in the right direction, the cheese-knife 19 will be brought down upon the cheese and the rod $24^b$ will project into the cut of the cheese a little below the edge of the piece about to be severed. Then upon further rotation of the shaft 23 the cutter 19 will be forced down through the cheese, thus severing a sector-shaped slice therefrom, and in such operation the rod $24^b$ will move downward with the plate 24 until it strikes the table A, when it slides upward, and the plate 24 will lie flat against the previously-exposed side of the cheese slice, thus supporting it and preventing it being broken, &c. The next step is the discharge of the severed cheese slice, which is effected, as before intimated, by depressing the thumb-lever 5, Figs. 2 and 8, whereby the front sector 6 of the table A, upon which the severed slice rests, will be drawn down into an inclined position, together with the hinged part 3, so that the slice slides from such depressed portion of A on part 3 and thence into the compartment $b'$ in the bottom of the casing B.

The gage-plate $24^a$, forming an attachment of the slice-supporter 24, is graduated, as shown in Fig. 9—that is to say, it is ruled lengthwise into equal narrow divisions which are marked at one end with numbers indicating the different weights of cheese in pounds—to wit, "18," "19," "20," &c. These longitudinal divisions are subdivided transversely by a series of rows of dots or short lines which are slightly inclined from the top downward toward the left. The several transverse divisions thus formed are marked "$\frac{1}{4}$," "$\frac{1}{2}$," "$\frac{3}{4}$," "1 lb.," &c., the range being from one-fourth of a pound to two pounds, as indicated in Fig. 9. The index 26 (shown in Figs. 9 and 10 and less distinctly in Figs. 1 and 7) consists in a bar having a series of adjustable fingers $26^a$. This may be formed in various ways, and I desire it understood that I do not restrict myself in this particular, the essential point being that the fingers shall be adapted to be turned to the right or left, as conditions may require. In this instance a flexible metal sheet is provided with a series of teeth or tongues $26^a$, the sheet being secured about the bar forming the body of the index and at the same time a keeper for the slidable gage-plate $24^a$. If now it be desired to cut a one-fourth-of-a-pound slice from a twenty-two-pound cheese, the principal point $26^a$, which is in line with the number "22" on the left-hand end of the gage-plate $24^a$, is turned to the left, as shown in Figs. 9 and 10. Then the slice-supporting plate $24^a$ is separated from the knife 19 until the left-hand tooth of the index is opposite or adjacent to the dot on the longitudinal line of the gage-plate which is nearest to the number "22." This position is indicated by dotted lines in Fig. 9. Such adjustment of the slice-plate 24 relative to the knife is the exact one required to enable the knife to sever a one-fourth slice. It will be observed in Fig. 9 that the heavier the cheese the nearer to the number indicating its weight is the index to be placed. In other words, the distance to which the slice-plate 24 is adjusted from the knife 19 varies with the thickness and weight of the cheese as a whole, the distance being less for the heavier cheeses and greater for the lighter ones.

As shown in Fig. 4, one of the hinged sections 6 of the cheese-table is provided with a series of points or spikes 30, the same being set in a row adjacent to the side edge of the section. The section selected will be the one upon which the last section of the cheese X will rest while being cut. The spikes 30 serve to hold the piece of cheese in due position while being sliced, since the weight of the same would no longer suffice for the purpose.

The box or casing B may be constructed in various ways and in various forms; but it is preferably provided with glass sides in its upper portion, and one of the sides is hinged, as indicated in Figs. 3 and 5, to allow a cheese to be readily placed on the table A. The glass front may be also adapted to be slid up and down; but these are details for which I make no claim. A distinguishing feature of the box is, however, the provision of the partition $b$ with an opening in which the hinged and depressible slice-discharger 3 is arranged. It will be noted that by this arrangement the cheese X is entirely inclosed and protected, while severed slices may be removed at will. The lower compartment $b'$ is open at the front, as shown in Figs. 1, 2, so that the slice delivered thereinto may be conveniently removed. The same construction also permits convenient access to the crank 18 of the sprocket-gearing.

In practice I prefer that the knife or cutter 19 shall make a shear cut so far as practicable. For this purpose its lower edge may be slightly inclined; but I prefer that the rack-gearing 21 22 shall be so constructed that the front end of the knife will be forced down slightly in advance of the inner end of the same. For this purpose the pinion which is nearest the front side of the box is made about one-third larger than the other, so that the front end of the knife will be caused to move downward faster than its inner end. To permit such movement, it is obviously necessary that the rack-bars 21 shall be pivoted to the knife 19 in such manner as to permit slight vertical oscillation of the knife. The latter also requires to be somewhat loosely hinged to the plate 24, as before intimated.

What I claim is—

1. The combination, with the cheese-holding table, a knife, and means for adjusting the same vertically, of a slice-supporting plate, and means for connecting it with the knife, substantially as shown and described.

2. The combination with a cheese-holding table, and a knife arranged above the same, and means for moving it vertically, of a slice-supporting plate and a slidable rod which normally extends slightly below the knife, and means for connecting said plate with the knife and supporting it in position while being forced down along with the latter, substantially as shown and described.

3. The combination with a cheese-holding table and a knife arranged horizontally and adapted to be moved vertically, of a slice-supporting plate which is hinged to said knife at its inner end, and thus adapted to swing laterally at its free end, substantially as shown and described.

4. The combination with a cheese-holding table and a knife arranged horizontally above the same, and means for adjusting it vertically, of a slice-supporting plate which is connected with the knife at its inner end, and a gage-plate applied to the outer ends of said knife and plate, and a device for indicating on the gage the point to which the slice-supporting plate shall be adjusted for a given weight of cheese, substantially as shown and described.

5. The combination with the vertically-movable knife and a slice-supporting plate hinged thereto at its inner end of the slotted gage-plate attached to the slice-supporting plate, and an index secured to the end of the knife and provided with reversible points for indicating on the gage the point to which the slice-supporting plate shall be adjusted for a given weight of cheese, substantially as shown and described.

6. The index for the use specified, consisting of a bar provided with flexible points, substantially as shown and described.

7. The combination, with the rotary table and a vertically-movable knife, of the slice-supporting plate hinged to the inner end of the knife, and an arc bar secured to said plate and working in a keeper and guide on the knife, and a clamp for securing it in any adjustment, substantially as shown and described.

8. In a cheese-cutting and slice-discharging apparatus, a table having a hinged depressible section, substantially as shown and described.

9. In a cheese-cutting and slice-discharging apparatus, a table having a series of depressible sections which are sector-shaped and hinged to a central portion or hub, and means for supporting the same in normal horizontal position, substantially as shown and described.

10. The combination, with the rotary shaft arranged vertically and having a fixed hub, of the series of depressible sector-shaped sections which are hinged to said hub and form therewith a plane top surface, and spring-supporting hinges for said sections, substantially as shown and described.

11. The combination with a horizontal surface, of a rotary cheese-holding table arranged above the same and having a depressible section, and means intervening such surface and table and serving to support the depressible section while being rotated, substantially as shown and described.

12. The combination, with a horizontal surface, and a rotary cheese-holding table arranged above the same and parallel thereto and composed of hinged depressible sections, of a device in the nature of a fixed bar and antifriction-roller which is applied between the table and the parallel lower surface so as to support the table-sections in the manner shown and described.

13. The combination, with a horizontal partition, having a depressible portion, of a rotary cheese-holding table having a depressible section, and a device connected with the depressible portions whereby both may be depressed together, substantially as shown and described.

14. The combination of a cheese-holding table, having a hinged spring-supported section, and a partition beneath the table having also a spring-supported depressible section, and means for connecting the two depressible portions whereby they are operated together, to effect the discharge of a slice severed from the cheese, substantially as shown and described.

15. The combination, with a horizontal partition having a depressible portion and a rotary cheese-holding table arranged above and parallel to the same, the said table having a depressible section provided on its under side with an arc-shaped rail, of a device secured to the depressible portion of the said partition and adapted to engage with and run upon the rail of the table-section, whereby the parts may be depressed together to effect discharge of a cheese slice, in the manner shown and described.

16. The combination, with a rotary cheese-holding table having hinged sections which are spring-supported and provided on their under sides with arc-shaped rails, of a slice receiving and discharging plate arranged below said table, and a device attached thereto and having an antifriction-roller adapted to run on the rails of the table, substantially as shown and described.

17. The combination, with a slice-holding table having a depressible section and a depressible section arranged below said table and normally parallel thereto, of a connecting device whereby both said parts may be depressed together, substantially as shown and described.

18. The combination, with a rotary cheese-holding table composed of spring-supported sections having separated arc-shaped rails hung from their under sides and a spring-supported depressible plate arranged below the table and provided with a thumb-lever as specified, of a device pivoted to said plate and provided with a roller adapted to run on the rails of the table-sections, substantially as shown and described.

19. The rotary cheese-holding table composed of a series of hinged spring-supported sections, one of which is provided with a series of vertical points adjacent to one of its side edges, substantially as and for the purpose specified.

20. The combination, of a box or casing having a horizontal partition $b$ provided with a hinged depressible portion 3 adapted to open downward into the lower compartment of said box, and a rotary cheese-holding table arranged in the closed portion of the box above said partition and provided with depressible sections, whereby severed slices of cheese may be delivered through the partition into the lower compartment, substantially as shown and described.

JOHN HENRY ROSE.

Witnesses:
F. C. MARSDEN,
W. R. THOMAS.